US011118962B2

(12) United States Patent
Engler et al.

(10) Patent No.: US 11,118,962 B2
(45) Date of Patent: Sep. 14, 2021

(54) OPTICAL SCANNER COMPRISING AN ELECTRONIC CONTROL DEVICE TO COUNTERACT CROSSTALK BETWEEN OPTICAL SCANNERS

(71) Applicant: SICK AG, Waldkirch/Breisgau (DE)

(72) Inventors: Michael Engler, Sexau (DE); Joachim Kraemer, Bad Krozingen (DE); Markus Hammes, Freiburg (DE); Ino Geisemeyer, Freiburg (DE)

(73) Assignee: SICK AG, Waldkirch/Breisgau (DE)

( * ) Notice: Subject to any disclaimer, the term of this patent is extended or adjusted under 35 U.S.C. 154(b) by 55 days.

(21) Appl. No.: 16/816,698

(22) Filed: Mar. 12, 2020

(65) Prior Publication Data
US 2020/0300692 A1    Sep. 24, 2020

(30) Foreign Application Priority Data

Mar. 18, 2019 (DE) .......................... 102019106750.2

(51) Int. Cl.
*G02B 26/12* (2006.01)
*G01J 1/04* (2006.01)

(52) U.S. Cl.
CPC .................................. *G01J 1/0403* (2013.01)

(58) Field of Classification Search
CPC ...... G01J 1/0403; G01S 7/4817; G02B 26/10; G02B 26/122
USPC ......................................... 250/235, 234, 216
See application file for complete search history.

(56) References Cited

U.S. PATENT DOCUMENTS

| 4,806,951 A * | 2/1989 | Arimoto ............ G06K 15/1261 |
| | | 347/235 |
| 2018/0292534 A1 | 10/2018 | Field | |

FOREIGN PATENT DOCUMENTS

| DE | 102016224304 A1 | 6/2018 |
| JP | 2005-221333 A | 8/2005 |
| JP | 2011-112503 A | 6/2011 |

OTHER PUBLICATIONS

German Office Action dated Feb. 17, 2020 corresponding to application No. 102019106750.2.
European Search Report dated Jul. 27, 2020 corresponding to application No. 20160861.9-1020.

\* cited by examiner

*Primary Examiner* — Que Tan Le
(74) *Attorney, Agent, or Firm* — Nath, Goldberg & Meyer; Jerald L. Meyer

(57) ABSTRACT

An optical scanner comprises a light transmitter for transmitting a light beam; a beam deflection unit that is configured to deflect the transmitted light beam in a periodically varying manner with a predefined period duration in order to scan a detection zone; a light receiver for receiving reflected light; and an electronic control device for controlling the beam deflection unit. The electronic control device is configured to automatically increase or decrease the period duration by a difference amount with respect to a nominal value before or during the operation of the optical scanner in order to counteract crosstalk between the optical scanner and a further optical scanner.

18 Claims, 1 Drawing Sheet

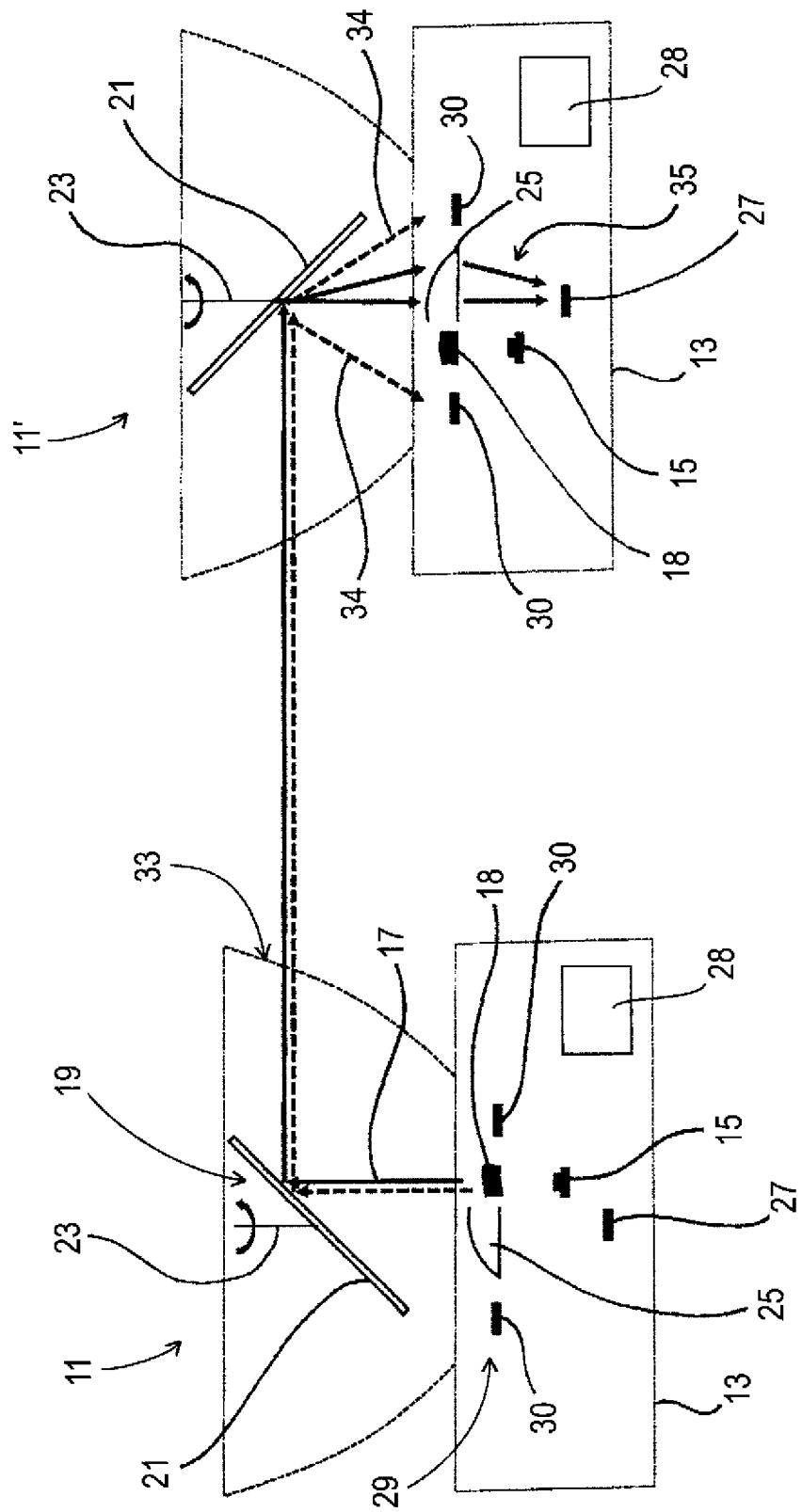

OPTICAL SCANNER COMPRISING AN ELECTRONIC CONTROL DEVICE TO COUNTERACT CROSSTALK BETWEEN OPTICAL SCANNERS

The present invention relates to an optical scanner comprising a light transmitter for transmitting a light beam; a beam deflection unit that is configured to deflect the transmitted light beam in a periodically varying manner with a predefined period duration in order to scan a detection zone; a light receiver for receiving reflected light; and an electronic control device for controlling the beam deflection unit.

Optical scanners are used in a variety of ways for monitoring and safeguarding tasks. In many application situations, a plurality of optical scanners of the same kind have to be assembled relatively close to one another. In this respect, a mutual influencing of the scanners can occur, which is also called "crosstalk". Specifically, the transmitted light beam of one optical scanner can enter the reception beam path of another optical scanner either directly or e.g. by reflections. If this only occurs occasionally, it is generally unproblematic since a multiple evaluation or averaging is typically carried out with optical scanners. However, if the described interference of one scanner by another scanner extends over a plurality of measurement cycles, the operation of the interfered scanner can be impaired. Problematic crosstalk therefore in particular occurs with synchronously operated beam deflection units, that is in particular when the optical scanners are set to the same scanning time or period duration. In the worst case, the interfered scanner can lose its detection capability, which is in particular unacceptable in safety applications.

To avoid the problem of crosstalk, optical scanners with different period durations can be provided by a user. For example, the period duration can be set slightly differently by the user in each scanner to be assembled. This procedure is time-consuming and annoying.

It is an object of the invention to simplify the assembly and operation of optical scanners and to decrease or reduce a mutual influence of a plurality of scanners that may be present.

The object is satisfied by an optical scanner having the features of claim 1.

In accordance with the invention, the electronic control device is configured to automatically increase or decrease the period duration by a difference amount with respect to a nominal value before or during the operation of the optical scanner in order to counteract crosstalk between the optical scanner and a further optical scanner.

It is ensured in this manner that no significant mutual influencing takes place even when using scanners of the same kind in a space. Since the increase or decrease of the period duration takes place automatically, the user does not have to take care of a corresponding adjustment. The device can, if necessary, itself influence the preset period duration. The invention thus enables a particularly reliable and safe use of optical scanners. It is of particular advantage in this respect that no complex measures and in particular no additional devices are required to bring about the automatic increase or decrease of the period duration. The corresponding functionality can rather be integrated in an existing electronic control device of an optical scanner in a simple and cost-effective manner.

The automatic increase or decrease of the period duration advantageously also counteracts mutual interference relating to devices for determining possible contamination of the front lens of the optical scanner.

An optical scanner in accordance with the invention is preferably designed as a laser scanner. It is furthermore preferred that an optical scanner in accordance with the invention is designed as a safety sensor. With safety sensors, the increase in reliability is of particular importance.

Provision can be made that the nominal value is adjustable and that the increase or decrease of the period duration performed for crosstalk protection is independent of the adjustment of the nominal value. A user can thus adjust the nominal value in the usual manner in order to adjust the scanning time, for example. The crosstalk protection made possible by the invention is not impaired by this adjustment.

In accordance with an embodiment of the invention, the deflection unit comprises a rotating mirror, wherein the electronic control device is configured to increase or decrease the rotational frequency of the rotating mirror in order to increase or decrease the period duration. A variation of the rotational frequency of a rotating mirror can be carried out in a simple manner. However, the deflection unit could generally also e.g. comprise an oscillating mirror.

A preferred embodiment of the invention provides that the difference amount is a random value or a pseudo-random value. The likelihood that the period durations of a plurality of scanners of the same kind will be increased or decreased by the same value is thereby extremely small. The difference amount can be provided by a random number generator or a pseudo-random number generator integrated in the electronic control device.

Alternatively, the difference amount can be selected from a stored table. The electronic control device can in particular be configured to jump further by one position in the table on each start of operation and/or on each calibration of the optical scanner. This has a similar effect to the provision of random values or pseudo-random values.

The difference amount is preferably selected, in particular randomly selected, within a tolerance range comprising the nominal value. This means that it is preferred not to permit any excessively large deviations of the period duration from the nominal value. It is precluded in this manner that the period duration, and thus the scanning time, adopts a value that is not desired by the user due to the automatic increase or decrease.

The width of the tolerance range can e.g. be selected such that it amounts to at most a quarter, and preferably to at most a tenth, of the nominal value. It is preferred to only slightly vary the period duration for the crosstalk protection. The tolerance range can in particular be so narrow that the increase or decrease of the period duration in accordance with the invention is not perceived by the user. From the point of view of the user, the nominal value of the period duration therefore remains the same despite an automatic increase or decrease.

In accordance with a further embodiment of the invention, the difference amount is larger than a predefined minimum amount. The minimum amount can in particular be selected such that the beat frequency, that is the amount of the difference between the scanning frequencies of two optical scanners, is sufficiently large. Sufficient crosstalk protection is thereby ensured.

The minimum amount can be selected in dependence on the nominal value and on an effective reception angle of the light receiver. The larger the sensitive angular range of the reception optics namely is, the larger the difference of the period durations of two scanners has to be in order to prevent crosstalk.

A specific embodiment of the invention provides that the minimum amount amounts to between 0.05% and 0.7% of the nominal value. This has proven to be particularly favorable in practice.

A further embodiment of the invention provides that the electronic control device is configured to perform the increase or decrease of the period duration with respect to the nominal value on a start of operation, in particular on each start of operation, of the optical scanner. The implementation of such a measure is particularly simple.

Alternatively or additionally, provision can be made that the electronic control device is configured to perform the increase or decrease of the period duration with respect to the nominal value on a calibration procedure of the optical scanner. In such an optical scanner in accordance with the invention, the period duration can therefore already be increased or decreased ex works with respect to the nominal value.

The electronic control device can also be configured to repeatedly or continuously perform the increase or decrease of the period duration with respect to the nominal value during the operation of the optical scanner. This particularly effectively counteracts crosstalk. Depending on the application, the increase or decrease of the period duration can take place periodically or stochastically, continuously or discontinuously.

The electronic control device can also be configured to perform the increase or decrease of the period duration with respect to the nominal value in a recognized crosstalk situation. In this embodiment, the period duration is only increased or decreased if necessary. An influence determined during the specific application can therefore be reduced or eliminated in that the device itself influences the period duration. The electronic control device can in particular also be configured to only perform the increase or decrease of the period duration in a recognized crosstalk situation. The recognition of a crosstalk situation can, for example, take place by means of an interference signature in the reception signal, e.g. an increased noise ratio, or by means of a noise signature in a histogram.

The invention also relates to an arrangement of at least two optical scanners that are each configured as described above. The risk of a mutual influence is minimized in such an arrangement. Each of the optical scanners preferably has an electronic control device that is configured as described above.

In accordance with an embodiment of the invention, the electronic control devices of the at least two optical scanners are configured to increase or decrease the respective period durations by different difference amounts. The beam deflection units are thereby detuned in time with respect to one another and mutual interference or glare occurs occasionally at most.

Further developments of the invention can also be seen from the dependent claims, from the description and from the enclosed drawing.

FIG. 1 shows an arrangement of two optical scanners in accordance with the invention in a schematic representation.

The optical scanner 11 shown in the left part of FIG. 1, called the first optical scanner 11 in the following, has a housing 13 in which a light transmitter 15 for transmitting a light beam 17 is arranged. The light transmitter 15 preferably comprises a laser diode. As shown, a transmission optics 18 is associated with the light transmitter 15. A beam deflection unit 19 is furthermore accommodated in the housing 13 and is configured to deflect the transmitted light beam 17 in a periodically varying manner with a predefined period duration in order to scan a detection zone. In the embodiment shown, the beam deflection unit 19 comprises a rotating mirror 21 that can be rotatingly driven about an axis of rotation 23. Light reflected back from an object moves via the rotating mirror 21 and a reception optics 25 onto a light receiver 27 that is likewise arranged in the housing 13. The light receiver 27 can in particular be an avalanche photodiode. Evaluation electronics, not shown in detail, of the first optical scanner 11 serve to recognize objects that are present in the detection zone on the basis of the light received by the light receiver 27. The evaluation electronics can be configured to determine the distance of a recognized object from the first optical scanner 11 in accordance with the generally known time of flight process. The first optical scanner 11 is equipped with an electronic control device 28 for the control of the beam deflection unit 19 and for the evaluation of the reception signals.

The first optical scanner 11 further comprises a device 29 for contamination measurement that is known per se and that comprises a plurality of contamination light receivers 30. The contamination light receivers 30 detect light that is scattered by a window 33 of the housing 13 in order to estimate the degree of contamination of the window 33 therefrom, such as is generally known. The contamination light receivers 30 can e.g. be arranged in a ring shape around the arrangement of transmission optics 18 and reception optics 25, in particular concentrically to the optical axis or to the axis of rotation 23. The device 29 for contamination measurement can be equipped with one or more light transmitters of its own or can use the light transmitter 15. Furthermore, the contamination measurement can be carried out in transmission or in reflection depending on the design.

The optical scanner 11' shown in the right part of FIG. 1, called the second optical scanner 11' in the following, is in principle designed identically to the first optical scanner 11, wherein components that are the same are designated by the same reference numerals. The two optical scanners 11, 11' are arranged next to one other and vertically slightly offset from one another such as is often the case when safeguarding access zones. It is understood that the distance shown and the vertical offset shown of the two optical scanners 11, 11' are purely exemplary and can vary in wide ranges in practice.

In the constellation shown, it could happen that the light beam 17 transmitted by the first optical scanner 11 reaches the light receiver 27 of the second optical scanner 11' via the rotating mirror 21 thereof as interference radiation 35. In such a case, the second optical scanner 11' will so-to-say be dazzled by the first optical scanner 11. The second optical scanner 11' would no longer be able to recognize objects correctly and in particular would no longer be able to determine distances correctly. A so-called drop-in could occur on which the distance values are detected as too short in a safety-directed manner. The availability of the second scanner 11' would be limited in such a case. On the other hand, a loss of the detection can occur on which the falsification of the reception signal prevents a distance measurement and causes a so-called drop-out. It could happen that the second optical scanner 11' loses its detection capability due to the interference radiation 35, which could lead to a dangerous switched-to-green state.

The device 29 for contamination measurement of the second optical scanner 11' could also be impaired by the first optical scanner 11. The contamination light receivers 30 could in particular be impacted by a transmitted light beam 17 of the light transmitter 15 or by a separate light beam of a contamination light transmitter, not shown, in dependence on the position of the rotating mirror 21. This is illustrated in FIG. 1 by the dashed arrows 34. They are shown in projection onto the paper plane just like the arrows of the interference radiation 35, whereas the associated actual beams can extend obliquely to said paper plane. Furthermore, not all of the arrows shown have to be associated with the same point in time or with the same position of the rotating mirror 21, but can rather belong to different spatial positions of the rotating mirror 21. Therefore, the reflections indicated in the FIGURE appear partly tilted or distorted. The availability of the second optical scanner 11 would be limited in a case of an interfering radiation reaching the contamination light receivers 30. The second optical scanner 11' could change to a switched-to-red state or even to a lockout state in this respect.

The same naturally also applies to an influencing of the scanner 11 by the scanner 11'.

To prevent said cross-talk situations, the invention provides that the electronic control devices 28 of the optical scanners 11, 11' are each configured to automatically increase or decrease the period duration by a randomly selected difference amount with respect to a nominal value before or during the operation of the associated optical scanner 11, 11'. The respective increase or decrease of the period duration is independent of a deliberate adjustment of the nominal value. The increase or decrease of the period duration can, for example, take place via an increase or decrease of the scanning time or of the scanning frequency.

Depending on the embodiment, the increase or decrease of the period duration with respect to the nominal value can take place on each start of operation of the optical scanner 11, 11' or as part of the calibration ex works. Alternatively, it is also possible to only perform the increase or decrease the period duration when a crosstalk situation is recognized.

The automatic increase or decrease of the period durations of the two optical scanners 11, 11' provides a desynchronization of the rotary movements of the rotating mirrors 21 and thus counteracts crosstalk. As mentioned above, a single incidence of a transmitted light beam 17 on the light receiver 27 of an adjacent scanner 11' is generally not critical. Unwanted malfunctions of the dazzled scanner 11' only occur in the case of a repeat incidence such as occurs with synchronously moving rotating mirrors 21. An interference of the device 29 for contamination measurement is likewise effectively counteracted by the automatic increase or decrease of the period duration in accordance with the invention.

The minimum difference for the rotation frequencies of two optical scanners 11, 11' depends on the effective reception angle of the light receiver 27 and can, for example, be determined by means of the following formula:

$$\varphi <= T \cdot f_S \cdot 360° \quad (1),$$

where $\varphi$ is the effective reception angle of the light receiver 27, T is the nominal period duration, and $f_S$ is the beat frequency $|f_1 - f_2|$.

For example, with a nominal scanning time of 40 ms and an effective reception angle of the light receiver 27 of 0.75°, the beat frequency amounts to at least 0.052 Hz. The minimum difference of the scanning times ΔT amounts to 0.084 ms.

The electronic control devices 28 are each configured to randomly select the difference amount within a tolerance range comprising the nominal value. The width of the tolerance range preferably amounts to at most a quarter of the nominal value. For example, the tolerance range in which the actual scanning times for different optical scanners 11, 11' are to be randomly distributed can amount to between 40 ms and 43 ms.

If a plurality of optical scanners 11, 11' in accordance with the invention are to be assembled in an association, they do not have to be configured differently in a cumbersome manner, that is they do not have to be set differently with respect to the nominal values of the period durations. Since relatively small variations of the nominal value are sufficient to effectively counteract crosstalk, the nominal values and thus the scanning times remain unchanged from the point of view of the user.

The assembly and operation of optical scanners 11, 11' in an association is thus considerably simplified by the invention.

REFERENCE NUMERAL LIST

11, 11' optical scanner
13 housing
15 light transmitter
17 light beam
18 transmission optics
19 beam deflection unit
21 rotating mirror
23 axis of rotation
25 reception optics
27 light receiver
28 electronic control device
29C device for contamination measurement
30 contamination light receiver
33 window
34 explanatory arrow
35 interference radiation

The invention claimed is:

1. An optical scanner comprising:
   a light transmitter for transmitting a light beam;
   a beam deflection unit that deflects the transmitted light beam in a periodically varying manner with a predefined period duration in order to scan a detection zone;
   a light receiver for receiving reflected light; and an electronic control device for controlling the beam deflection unit,
   wherein the electronic control device automatically increases or decreases the period duration by a difference amount with respect to a nominal value before or during the operation of the optical scanner in order to counteract crosstalk between the optical scanner and a further optical scanner.

2. The optical scanner in accordance with claim 1, wherein the deflection unit comprises a rotating mirror and the electronic control device increases or decreases the rotational frequency of the rotating mirror in order to increase or decrease the period duration.

3. The optical scanner in accordance with claim 1, wherein the difference amount is a random value or a pseudo-random value.

4. The optical scanner in accordance with claim 1, wherein the difference amount is selected from a stored table.

5. The optical scanner in accordance with claim 1, wherein the difference amount is selected within a tolerance range comprising the nominal value.

6. The optical scanner in accordance with claim 5, wherein the difference amount is randomly selected within a tolerance range comprising the nominal value.

7. The optical scanner in accordance with claim 5,
wherein the width of the tolerance range amounts to at most a quarter of the nominal value.

8. The optical scanner in accordance with claim 7,
wherein the width of the tolerance range amounts to at most a tenth of the nominal value.

9. The optical scanner in accordance with claim 1,
wherein the difference amount is larger than a predefined minimum amount.

10. The optical scanner in accordance with claim 9,
wherein the minimum amount is selected in dependence on the nominal value and on an effective reception angle of the light receiver.

11. The optical scanner in accordance with claim 9,
wherein the minimum amount amounts to between 0.05% and 0.7% of the nominal value.

12. The optical scanner in accordance with claim 1,
wherein the electronic control device performs the increase or decrease of the period duration with respect to the nominal value on a start of operation of the optical scanner.

13. The optical scanner in accordance with claim 12,
wherein the electronic control device performs the increase or decrease of the period duration with respect to the nominal value on each start of operation of the optical scanner.

14. The optical scanner in accordance with claim 1,
wherein the electronic control device performs the increase or decrease of the period duration with respect to the nominal value on a calibration procedure of the optical scanner.

15. The optical scanner in accordance with claim 1,
wherein the electronic control device repeatedly or continuously performs the increase or decrease of the period duration with respect to the nominal value during the operation of the optical scanner.

16. The optical scanner in accordance with claim 1,
wherein the electronic control device performs the increase or decrease of the period duration with respect to the nominal value in a recognized crosstalk situation.

17. An arrangement of at least two optical scanners that each comprise:
   a light transmitter for transmitting a light beam;
   a beam deflection unit that is configured to deflect the transmitted light beam in a periodically varying manner with a predefined period duration in order to scan a detection zone;
   a light receiver for receiving reflected light; and an electronic control device for controlling the beam deflection unit,
   wherein the electronic control device automatically increases or decreases the period duration by a difference amount with respect to a nominal value before or during the operation of the optical scanner in order to counteract crosstalk between the optical scanner and a further optical scanner.

18. The arrangement in accordance with claim 17,
wherein the electronic control devices of the at least two optical scanners increase or decrease the respective period durations by different difference amounts.

* * * * *